United States Patent [19]

Breitscheidel et al.

[11] Patent Number: 4,917,944
[45] Date of Patent: * Apr. 17, 1990

[54] MULTI-PLY WEATHERABLE PLASTICIZER-FREE SHEET

[75] Inventors: Hans-Ulrich Breitscheidel, Siegburg; Rudolf Kautz, Hennef; Werner Kühnel, Neukirchen-Schöneshof; Manfred Simm, Troisdorf; Paul Spielau, Troisdorf-Sieglar; Richard Weiss, Troisdorf, all of Fed. Rep. of Germany

[73] Assignee: Huels Troisdorf Aktiengesellschaft, Troisdorf, Fed. Rep. of Germany

[*] Notice: The portion of the term of this patent subsequent to Jun. 14, 2005 has been disclaimed.

[21] Appl. No.: 102,667

[22] Filed: Sep. 30, 1987

Related U.S. Application Data

[62] Division of Ser. No. 867,543, May 28, 1986, abandoned.

[30] Foreign Application Priority Data

May 28, 1985 [DE] Fed. Rep. of Germany ....... 3519064
Apr. 29, 1986 [EP] European Pat. Off. ........ 86105883.2

[51] Int. Cl.⁴ .............................................. B32B 27/08
[52] U.S. Cl. .................................. 428/308.4; 428/516; 428/517; 428/519; 428/520
[58] Field of Search ............... 428/319.7, 322.7, 308.4, 428/516, 517, 519, 520

[56] References Cited

U.S. PATENT DOCUMENTS

| | | | |
|---|---|---|---|
| 4,433,073 | 2/1984 | Sano | 523/201 |
| 4,459,380 | 7/1984 | Vostovich | 524/94 |
| 4,634,735 | 1/1987 | Thiersault | 525/88 |
| 4,751,121 | 6/1988 | Kühnel | 428/40 |

OTHER PUBLICATIONS

EPO, 0052469, May 26, 1982.

*Primary Examiner*—Christopher Henderson
*Attorney, Agent, or Firm*—Antonelli, Terry & Wands

[57] ABSTRACT

The invention describes a weatherable, plasticizer-free, uncrosslinked, and deep-drawable sheet, especially for the internal outfitting and external outfitting of automotive vehicles, as well as a process for its production, containing 65-25% by weight of a partially crystalline ethylene-propylene-diene terpolymer and 35-75% by weight of a homo- and/or copolymer of propylene, 0-10% by weight of fillers, as well as stabilizers and lubricants, the extruded or calendered sheet exhibiting a tensile strength at break in the longitudinal direction of at least 20 N/mm². An advantageous further development of the invention comprises a composite sheet of EPDM/PP sheet with a crosslinked polyolefin foam layer.

10 Claims, 1 Drawing Sheet

MULTI-PLY WEATHERABLE PLASTICIZER-FREE SHEET

Cross-Reference to Related Application

This is a division of application Ser. No. 867,543, filed May 28, 1986, now abandoned.

BACKGROUND OF THE INVENTION

The invention relates to a weatherable, plasticizer-free, uncrosslinked, and deep-drawable sheet, especially for use in the internal and external outfitting of automotive vehicles, based on ethylene-propylene-diene terpolymers, homo- and/or copolymers of propylene, and optionally fillers and customary additives, produced by extrusion or calendering, with a sheet thickness of about 0.2–3 mm, as well as to a process for the production of such sheets.

Up to this time, plasticized PVC sheets have been employed for the internal paneling and outfitting of automotive vehicles, such as, for example, side paneling, crash pads, dashboards, headrests, domes, or on external surfaces as corrosion protection. Plasticized PVC sheets exhibit the drawback, however, that the plasticizer during the course of time bleeds out or evaporates and leaves undesirable deposits, for example on the windshields which must be repeatedly removed. Another disadvantage resides in the polyvinyl chloride content since when mounting the sheet in the region of the exhaust duct and of the engine there is the danger of formation of hydrogen chloride, promoting corrosion, on account of the high exhaust gas temperatures. Also, the sheet becomes brittle on account of loss of plasticizer, occurring during the course of time, which has an adverse effect on the functional efficacy and lifetime of the sheet, particularly at temperatures below zero degrees C.

DOS 2,806,726 describes a protective layer for floors of automotive vehicles, designed as drumming insulation, which layer contains a carrier layer on the basis of polyolefins, especially ethylene-propylene elastomer, and at least 30% by weight, preferably at least 70% by weight of fillers based on bitumen, plasticizing materials, such as oils, and acoustically effective mineral substances, such as talc, ground shale, graphite, mica. This heavy sheet, which is predominantly soft-plastic and provides noise protection, is permanently bonded to the sheet metal of the car body by means of vulcanizing adhesives or heat-sealing adhesives. The high filler proportions of this sheet, however, reduce the strength properties of the sheet and, in case of calendered sheets, promote so-called crazing. Since the sheets are shaped during application onto the body parts, crazing is undesirable in any event for optical reasons. Also protection against stone impact is inadequate in this protective layer.

DOS 2,732,969 discloses blends of uncrosslinked ethylene-propylene sequential polymers with isotactic polypropylene which can be processed, for example, by pressure molding or extrusion, into molded articles, such as bumpers, seat shells, moldings, dashboards, spoilers, instrument boards, steering wheel casings, as well as ski boots. These blends, however, depending on their composition, either do not exhibit adequate cold flexibility or do not have sufficient deflection temperature under load.

DOS 2,742,910 describes a thermoplastic elastomer mixture of 25–85% by weight of a practically amorphous ethylene-propylene copolymer and 15–75% by weight of a crystalline block copolymer of propylene, especially well suited for the manufacture of cable sheathing and bumpers for automotive vehicles. However, as stated in DOS 2,821,342, the thermoplastic elastomer mixtures of DOS 2,742,910 are definitely in need of improvement with respect to hardness, tensile strength, increase in high-temperature stability, in connection with a number of usages, and they are surpassed in these properties, for example, by a molding composition and molded parts produced therefrom as set forth in DOS 2,821,342.

DOS 2,821,342 relates to thermoplastic elastomer mixtures containing 30–75 parts of a crystalline, isotactic propylene homopolymer and 25–70 parts of an essentially amorphous, rubbery ethylene-propylene polymer and maximally 15 parts of polyethylene, replacing in proportion the propylene homopolymer. Although these mixtures exhibit, in part, improved properties as compared with binary molding compositions, it has been found that there is definitely a need for improvement in mechanical properties for extreme stresses as concerns the elastomer mixtures known from DOS 2,821,342, in particular regarding the notch impact resistance, tensile strength, and cold flexibility. This is also due, in particular, to the essentially amorphous, rubbery ethylene-propylene polymers utilized On the other hand, higher-crystalline EPDM or EPM elastomers, which can be designated as being partially crystalline, with a crystallization temperature (DSC maximum temperature) from/above 24° C., are considered unsuitable for the areas of usage indicated in DOS's 2,742,910 and 2,821,342.

The company newsletter "Der Lichtbogen" [The Electric Arc]by CHW Huels, September 1974, No. 174, pages 18–22, discloses the use of ethylenepropylene elastomer for injection-molded parts for use in the automobile producing industry as well as for roofing sheets and other products.

SUMMARY OF THE INVENTION

The invention is based on the object of providing a weatherable, plasticizer-free, uncrosslinked, and deep-drawable sheet suitable for use in the internal and external outfitting of automotive vehicles and satisfying the high demands characteristic for such usage with respect to mechanical properties, such as tensile strength, high cold flexibility, notched impact resistance and deflection temperature under load, weatherability. The invention suggests a sheet based on a thermoplastic elastomer mixture, characterized in that it contains 65–25% by weight of a partially crystalline ethylene-propylene-diene terpolymer with 65–82% by weight of ethylene
18–35% by weight of propylene
3–8% by weight of a diene tercomponent, with a melt index MFI (230/5) of 0.5–2.0 g/10 min, a tensile strength of at least 10 N/mm$^2$, and a DSC maximum temperature of at least 40° C.; 35–75% by weight of a propylene homopolymer and/or propylene copolymer with a melt index MFI (230/2.16) of smaller than 2 g/10 min, but no smaller than 0.2 g/10 min; 0–10% by weight of fillers, such as chalk, kaolin, talc, carbon black, silica, silicic anhydride, or the like, or mixtures thereof, as well as, per 100 parts of the aforementioned synthetic resins, 0.1–1.0 part by weight of stabilizers, such as sterically hindered phenolic antioxidants, phenolic phosphites, thioesters of aliphatic carboxylic acids, 0.1–2 parts by weight of lubricants, such as metallic salts of carboxylic acids, montanic acid esters, hydrogenated hydrocarbon resins, 0–5 parts by weight of colorants, 0–4 parts by weight of aliphatic and/or naphthenic extender oils.

The sheet of this invention, free of filler or almost free of filler, made from ethylene-propylene-diene terpolymer (EPDM) and polypropylene meets an array of property requirements ensuring long service life and functional capacity also required in the field of usage in the automobile industry. The sheet of this invention can be processed into desired molded parts by shaping processes such as deep drawing methods, vacuum forming, or also cold forming.

The sheet according to the invention is distinguished, in particular, by the properties recited below:

1. very good stone impact resistance;
2. good low-temperature stability;
3. high tensile strength at break and high elongation;
4. high tear propagation resistance;
5. low moisture sensitivity;
6. good abrasion resistance;
7. adequate gasoline resistance;
8. good light and weathering stability;
9. matte surfaces, suitable for embossing;
10. good deep drawability;
11. temperature stability of a molded part made from the sheet, i.e. good deflection temperature under load;
12. no back shrinking under sunlight acting on a shaped part made from the sheet;
13. no crazing of the sheet during shaping;
14. preserving of embossing of the sheet even during and after shaping; and
15. corrosion protection.

The sheet of this invention accordingly is especially suitable for the internal and external outfitting of automotive vehicles since it shows good strength values with good weatherability and service life at high temperatures as well as at low temperatures, and also exhibits high resistance against abrasion, stone impact, and similar mechanical surface stresses.

The sheet can also be manufactured with an appropriate coloration and can be shaped, on account of its good deep drawability, in variegated form into corresponding molded parts individually or in combination with further materials.

The partially crystalline ethylene-propylene-diene terpolymers selected according to this invention and utilized for the sheet, with a very high tensile strength and, respectively, tensile strength at break, preferably of at least 15 N/mm², the degree of crystallinity of which is correlated with the DSC maximum temperature and amounts to at least about 40° C., in the preferred range at least about 43° C., make it possible in cooperation with the selected polypropylenes to manufacture the sheet by means of calendering or extrusion with the aforedescribed properties.

In this connection, especially suitable as the tercomponent is ethylidene norbornene, but also dicyclopentadiene.

Since the extent of crystallinity is also correlated with the ethylene content, and likewise with the tensile strength, a preferred embodiment of the invention provides to utilize ethylene-propylene-diene terpolymers with an ethylene content of at least 70% by weight.

The partially crystalline EPDM's also exhibit the advantage from the viewpoint of processing technique over the amorphous or almost amorphous EPDM's that they are obtained in crumb form and can also be pelletized and thus are readily meterable and mixable and therefore can be processed directly by means of continuously operating mixing machines. In contrast thereto, the amorphous elastomers are rubbery and are present in lump or bale form and cannot be pelletized without additives.

The DSC maximum temperature of the EPDM's is measured by means of the differential scanning calorimeter, and the heat of crystallization is also determined thereby. Also the latter is a measure for the degree of crystallization. The heat of crystallization of the ethylene-propylene-diene terpolymers utilized in accordance with the invention should be at least 15 cal/g.

The propylene homopolymer and/or propylene copolymer utilized is constituted preferably by products having a melt index MFI (230/2.16) of smaller than 2 g/10 min, preferably smaller than 1 g/10 min, but no smaller than 0.2 g/10 min. This involves, in particular, selected propylene homopolymers, statistical propylene copolymers, block propylene copolymers with 5–20% by weight of copolymerized ethylene, which exhibit an especially low melt index. These selected polypropylenes afford, together with the ethylene-propylene-diene terpolymers employed, good processability into sheets by calendering, which is an especially economical method, or also by extrusion. In this connection, sheets having a thickness of about 0.2–1.0 mm are preferably manufactured by calendering whereas sheets with thicknesses of about 0.7–3 or more millimeters can be produced by extrusion. It is also possible to make thinner sheets into thicker sheets by laminating or doubling of calendered and/or extruded sheets. Since polypropylene exhibits very strong tackiness, it is extraordinarily difficult to calender polypropylene while avoiding sticking to the calendering rolls. Also for precluding this sticking of polypropylene during calendering, narrow processing parameters of the indicated type must be maintained. The selection of stabilizers and lubricants is also of importance in this context. However, when producing the sheet by calendering, it has to be kept in mind that polypropylene having a MFI (230° C./21.6 N) smaller than 0.1 g/10 min is no longer usable since it can no longer be adequately calendered.

In order to prevent degradation of the polymers during plasticizing and calendering or extrusion, and to make it possible, at the same time, to employ maximally high processing temperatures, the provision is made to include, in particular, stabilizers and antiaging media for polyolefins, particularly based on sterically hindered phenolic antioxidants, phenolic phosphites, thioesters of aliphatic carboxylic acids, optionally mixtures thereof, but with the use of relatively minor amounts.

Examples for suitable stabilizers are pentaerythritol tetra-μ-3,5-di-tert-butyl-4-hydroxyphenyl propionate; 2,2'-methylenebis(4-methyl-6-tert-butylphenol), distearyl pentaerythritol diphosphite, and 2,6-di-tert-butyl-4-methylphenol.

Lubricants that are added for processing are, in particular, metallic salts of carboxylic acids, such as, for example, calcium soaps, calcium stearate, zinc stearate, and also as further processing aids, in particular, montanic acid esters and/or hydrogenated hydrocarbon resins.

Also other auxiliary materials can be contained in the sheet, such as flame retardants, UV absorbents.

The compositions utilized according to this invention can very surprisingly be readily processed, also more easily than, for example, polypropylene by itself, into calendered or extruded sheets.

Since fillers generally reduce the strength properties of the sheet, fillers are utilized in the sheet of this invention only in small amounts; these fillers can involve, on the one hand, inorganic pulverulent fillers, such as chalk, talc, lime or kaolin, or, alternatively and preferably, also so-called reinforcing fillers, such as semiactive or active carbon blacks, silica, silicic anhydride, glass fibers, or mixtures of the aforementioned fillers. Also mica or barite can be provided in small amounts. The fillers are to be very finely divided so that they do not show adverse effects during subsequent processing of the sheet by thermoforming or press molding etc., and so that they do not impair surface quality, either. The fillers should not exceed a particle size determined by passage through a 30 μm sieve, but should range preferably below 20 to 10 μm sieve size.

It is, of course, also possible to furthermore add colorants to the sheet, but these should likewise be very finely divided as in case of the other fillers, so that they do not exert a negative influence, either, during further processing and/or shaping of the sheet. Suitable colorants are, besides dyes, pigments, such as titanium dioxide, also carbon black in small amounts, the latter additionally providing the advantage of enhancing weatherability of the carrier layer. In this connection, small proportions in the carrier layer are already adequate.

Additionally, for enhancing processability of the ethylene-propylene polymers, it is also possible to add elasticizing materials in small amounts of below ~4 parts by weight, based on 100 parts by weight of polymer, such as aliphatic and/or naphthenic extender oils.

A preferred embodiment of the sheet according to the invention with high elastomer proportions, which exhibits especially good properties under low temperatures, such as high impact resistance, is distinguished by the composition in accordance with the feature of claim 2.

For usage areas in an automotive vehicle where no extreme low-temperature impact resistance is required, for example in interior outfitting, a sheet is suggested according to this invention which is of a somewhat higher hardness setting, as characterized by the features of claim 3.

The sheet of this invention can be finished especially well by embossing the surface in a matte or grained texture. The quality of the material for the sheet becomes apparent in this process, since the embossing on the surface of the sheet remains perfectly preserved even during a subsequent shaping of the sheet, for example by vacuum deep drawing. It is also possible optionally to imprint or coat the surface of the sheet. In this connection, no special pretreatment of the sheet surface is needed when using suitable coating agents, such as, for example, bicomponent varnishes.

An essential characteristic of the sheet of this invention is its deep drawability, i.e. the possibility of manufacturing molded parts from corresponding cut-to-size sections of the sheet, especially by thermoforming, such as deep drawing, or pressure molding, for example by means of vacuum against a corresponding mold, or in a closed mold. The high flexibility of the sheet permits a high degree of deformation and thus a good adaptation to predetermined forms. However, the sheet according to this invention is also so extensively flexible and deformable, of course likewise in dependence on the thickness, that it can be applied, in case of small degrees of deformation desired, even without preforming in the heated condition by cold forming to correspondingly preformed parts. In any event, a molded part produced from the sheet of this invention is distinguished by high trueness to form and high deflection temperature under load. The additional feature is included here that the sheet surface, subsequently embossed during manufacture, for example by calendering or extrusion, retains its embossed pattern even during thermoforming, for example deep drawing, on account of the good deflection temperature under load displayed by the sheet.

For internal outfitting of an automotive vehicle, the sheet of this invention can be utilized, for example, for producing molded parts such as side panelings, inner door panelings, armrests, tunnel covers, dashboards, domes, entirely or partially from the sheet. It is also possible to join the sheet with additional sheets or flat textile articles, or laminate same, or also work same, for example, into crash pads or provide a foam backing, for example with polyurethane foam.

In the external area of an automotive vehicle, the sheet of this invention can be applied directly or as a molded part as a protective covering, and utilized in this form.

A procedure according to this invention for manufacturing the sheet having a composition according to the invention can be derived from the features of claim 14.

For good processability of the molding composition for the manufacture of uniform, void-free sheets by preferably calendering or also extrusion, the melt index MFI (230/5) of the synthetic resin composition is to be chosen according to this invention to be in a range from about 0.8 to about 10 g/10 min, preferably in a range from 1 to about 6 g/10 min. Since the partially crystalline EPDM's selected are present in particle shape or can be produced in particle shape, the materials can, in a simple manner, be mixed, for example a heated-cooled mixer combination, and fed in metered amounts, and plasticized with the aid of the devices conventional for synthetic resins, such as kneaders or extruders or screw-type masticators, respectively, at a composition temperature of 165° to about 210° C. This composition can be further plasticized and homogenized in an additional, second plasticizing step at higher temperatures, for example on rolls or in a strainer or for passing the composition on to a calender. The calender should exhibit at least four rolls which can be arranged in the conventional pattern, such as I, L, F or Z. For calendering the sheets of this invention, the calendering rolls, as seen in the working direction, should exhibit a slightly descending temperature; the first two feed rolls should exhibit the highest temperature, preferably 190°–230° C., whereas the final calendering roll could have a temperature lower by 20°–30° C. since it serves essentially for smoothing and sizing. The sheet of this invention can be calendered with roll take-off speeds and thus production rates of at least 10 meters per minute and more, in dependence on the thickness of the sheet.

During extrusion of the sheet of this invention, the plasticizing and shaping can take place continuously in one apparatus, i.e. in one extruder, there being provided also in this case an ascending temperature gradient from the feed zone to the ejection zone, beginning with about 100° C. to maximally about 250° C. Very thick sheets are then called panels.

In the manufacture of the sheets by calendering or extrusion, it is possible to effect directly inline a surface embossing on one surface side of the sheet, in accordance with the features of claim 15.

For producing molded parts, for example as paneling parts for an automobile, punched-to-size sections are made from the sheet of this invention, in correspondence with the configuration of the desired molded part; these sections are then preheated to temperatures of about 120° to about 170° C. and are then shaped into the desired configuration with the use of pressure and/or vacuum.

In this process, the sheet can be perfectly shaped, i.e. without crease formation and without crazing. Especially suitable molding methods are the deep drawing processes, such as vacuum deep drawing, vacuum pressure forming with male or female mold. The thus-produced molded parts exhibit a very good molding characteristic and an extraordinarily good deflection temperature under load.

The sheet can also be processed by means of blow molding with the use of excess pressure to obtain a molded part.

The sheet of this invention can also be joined with additional flat articles into composite sheets or multi-ply sheets, for example by laminating or by adhesion promoters. In particular, composites of the sheet with metal sheets or metal plates or foils exhibit good corrosion resistance and rigidity accompanied by cold forming capability. Such PP-EPDM films made into a laminate with metal sheets enjoy a broad field of application.

The sheet according to this invention can also be part of a multi-ply sheet and can be bonded, for example, to flat textile articles. In many cases, comfortable-handle and soft paneling members are desirable for the internal outfitting of automotive vehicles, heretofore produced, for example, by backing plasticized PVC sheets with a foam material, especially plasticized PVC foam. However, all materials that contain plasticizer are burdened by the disadvantages discussed hereinabove, occurring due to exuding of plasticizers. Therefore, efforts have been expended to utilize, for the internal outfitting of automotive vehicles, also plasticizer-free, but elastic foam materials, such as, for example, crosslinked or uncrosslinked polyolefin foams, as known, for example, from German Patent Nos. 1,694,130; DAS 1,694,194; or DAS 2,417,557, and others. Since ordinary polyolefin, such as polyethylene, is nonpolar, it cannot be bonded directly, i.e. without adhesion promoter, to many materials, or can be bonded only with inadequate adhesive strengths.

It has now been found surprisingly that the sheet of this invention can be directly joined with adhesive strength by thermal pressure bonding or flame laminating to a crosslinked polyolefin foam material containing, in 100 parts by weight of polyolefin resin and, respectively, polyolefin resin mixture, at least 15% by weight, preferably at least 20% by weight, of a polar, copolymerized monomer. The polyolefin resins suitable for use in the invention for the foam material comprise herein low-density, medium-density, or high-density polyethylene, ethylene-propylene copolymers, ethylene-butene copolymers, ethylene-styrene copolymers, ethylene-vinyl acetate copolymers, ethylene-acrylic acid copolymers, ethylene-acrylic acid ester copolymers, ethylene-acrylic acid salt copolymers, polybutene-1, propylene-butene copolymers, or, respectively, mixtures of two or more of these polymers.

It is also possible to replace relatively small amounts of the polyolefin resin by elastomers miscible therewith, or by miscible synthetic resins, but in this case the content of polar copolymerized copolymer is to be based on the total resin content.

The miscible elastomer types encompass natural rubber, ethylene-propylene rubber, butyl rubber, polyisobutylene, polybutadiene, polyisoprene, and styrene-butadiene rubber.

The miscible synthetic resins include acrylo-nitrile-butadiene-styrene resins, polystyrene, chlorinated polyethylenes, chlorinated polypropylenes, and chlorosulfonated polyethylenes.

The total quantity of elastomer and/or of the synthetic resin, which are mixed therewith, is equal to or smaller than that of the polyolefin and preferably amounts to 10-45 parts by weight per 100 parts by weight of polyolefin.

The crosslinked polyolefin foam materials utilized for producing the composite sheet of this invention made of polypropylene-ethylene-propylene-diene terpolymer sheet and foam layer, are manufactured especially by peroxidic crosslinking with foaming by the use of chemical blowing agents. However, it is also possible to utilize physically crosslinked polyolefin foam materials which, in such a case, contain no crosslinking agent.

Suitable crosslinking agents are organic peroxides, such as dicumyl peroxide, di-tert-butyl peroxide, 1,3-bis(tert-butylperoxyisopropyl)benzene, 2,5-dimethyl-2,5-di(tert-butylperoxy)hexane and 2,5-dimethyl-2,5-di(tert-butylperoxy)hexyne 3; azide compounds, such as 1,9-nonanebis(sulfonazide and 1,7-heptanebis(sulfonazide); and silicon-containing peroxide, such as silyl peroxide.

The crosslinking agent is selected so that it is thermally decomposed at a temperature lower than the decomposition temperature of the blowing agent to be employed.

The amount of crosslinking agent depends on the type of polyolefin and of the blowing agent, and on the amount of blowing agent, and is 0.01–3 parts by weight per 100 parts of polyolefin.

The blowing agent has a decomposition temperature that lies higher than the softening point of the polyolefin and also has a decomposition temperature higher than that of the crosslinking agent. The blowing agent is utilized in a quantity of 0.1–30 parts by weight per 100 parts of resin. The blowing agent includes, for example, azodicarbonamide, dinitrosopentamethylenetetramine, barium azodicarboxylate, hydrazodicarbonamide, p-toluenesulfonyl semicarbazide, and trihydrazine triazine.

Polyolefin, crosslinking agent and blowing agent are kneaded with intermixing prior to thermal blowing. Kneading is customarily carried out in a powder mixer with rotor, a mixing roll, a Banbury mixer, or an extruder. The procedure must be gentle to prevent decomposition of the crosslinking agent and the blowing agent.

The resin composition is shaped into panels, sheets, particles, etc. by means of an extruder, a press, a calendering roll, etc. In this process stage, it is important to avoid decomposition of the crosslinking agent and of the blowing agent, just as in the kneading process.

During the blowing step, heating is customarily effected in one stage by raising the temperature to such a high value that the crosslinking agent and the blowing agent are decomposed. However, it is also possible to utilize a two-stage heating procedure in such a way that first the crosslinking agent is decomposed and, subsequently, the blowing agent is decomposed by further increases in temperature. Decomposition of the crosslinking agent and blowing agent can be conducted by heating under high pressure; expansion can then be effected by lowering the pressure. Preformed, foamable particles can be foamed in a metallic mold to result in foamed products.

Panel-shaped, foamable material can be continuously converted into a foam panel by heating on a wire-mesh conveyor in a hot-air furnace.

According to the invention, it has been found that a high adhesive strength, measured as separating force according to DIN 53 357, is obtained with such a polyolefin foam material containing polar copolymers, such as, for example, ethylene-butyl acrylate and/or ethylene-vinyl acetate, in adequate amounts. In particular, a crosslinked polyolefin foam having a butyl acrylate content of more than 9% by weight, preferably more than 15% by weight has proven to be especially suited for flame laminating to a PP/EPDM sheet. At high laminating speeds, separating strengths are obtained lying above the intrinsic strength of the foam material employed.

The invention can be realized with a polyolefin foam material containing as the polyolefin resin exclusively a polar copolymer, such as ethylene-butyl acrylate, ethylene-ethyl acrylate, or ethylene-vinyl acetate if it includes adequate contents of vinyl acetate and/or butyl acrylate and/or ethyl acrylate, or also with blends of these copolymers with a polyethylene or another polyolefin, but maintaining the aforementioned conditions.

It is possible, in particular, to manufacture composite sheets in accordance with this invention wherein the separating strength between PP/EPDM sheet and foam layer amounts to at least 8 N/5 cm, preferably more than 12 N/5 cm and is, in particular, higher than the intrinsic strength of the foam material.

The degree of crosslinking of the polyolefin foam employed normally ranges between 60% and 80%, depending on the course of the process. The crosslinked polyolefin foam materials involve also predominantly closed-cell, elastic foams. These impart to the composite sheet of PP/EPDM sheet and polyolefin foam layer produced according to this invention an especially soft handle of the composite. Moreover, the composite sheet according to this invention is also distinguished by a very good deep drawability, the foam structure being likewise preserved. Also the composite sheet excels by special lightweight characteristics, high low-temperature impact resistance, and high impact strength.

The sheet of polypropylene and ethylene-propylene-diene terpolymer, free of filler or almost free of filler, according to this invention, meets, in conjunction with the special adhesive foam layer, an array of property requirements ensuring, in the range of application in the automobile industry, a long lifetime and functional capability.

In particular, foam layers in the range from about 2 mm to 20 mm are laminated to the PP/EPDM sheet to obtain the composite sheet, namely without a layer of adhesion promoter, either by the flame laminating method or by thermal pressure bonding; in each of the processes, the layers to be joined together are preliminarily heated to a temperature lying above the plasticizing temperature of the synthetic resin and are bonded together. Flame laminating is conducted with conventional devices, the speed being dependent on the type of foam and the foam thickness. Here again, it is found that the acrylate-containing polyolefin foam is superior to the foam containing vinyl acetate since in case of the former a good adhesion is attained even at higher laminating speeds.

In particular, lightweight foams with weights per unit volume of about 20–70, preferably of about 20–40 $kg/m^3$ are utilized for the composite sheet.

A chemically crosslinked polyolefin foam material is preferred for the composite sheet of this invention since such foam material can be permanently shaped to an adequate extent even subsequently by means of deep drawing or the like, also in conjunction with the PP/EPDM sheet. However, physically crosslinked polyolefin foams can also be utilized.

In the examples set forth below, production of the thermoplastic, crosslinked polyolefin foam is performed as disclosed in German Patent No. 1,694,130, by mixing the polymers with the blowing agent, the peroxide, and possible additives, and compounding the mixture, and subsequently molding the mixture into a homogeneous matrix by way of an extruder. The foaming step is conducted directly or after intermediate storage in a heating furnace at temperatures of 200°–250° C. The amount of blowing agent added depends on the desired gross density.

BRIEF DESCRIPTION OF THE DRAWINGS

The invention is illustrated by way of example in the drawing wherein

FIG. 1 shows schematically the structure of a composite sheet 1. The sheet 2 consists essentially of a calendered or extruded synthetic resin sheet on the basis of EPDM and propylene homopolymer and/or propylene copolymer. This sheet 2, which can optionally be embossed on its topside 5, is adhesively bonded on its underside to the foam layer 3. The composite sheet 1 depicted in FIG. 1 is shaped, for example, into a molded part 1a according to FIG. 2. This shaping step can take place, for example, by means of deep drawing, during which step the composite sheet is preheated to a temperature of about 125°–150° C. and then molded against a mold by means of vacuum. In this shaping process, the topside of the sheet 2 comes into contact with the mold.

Figure 1:
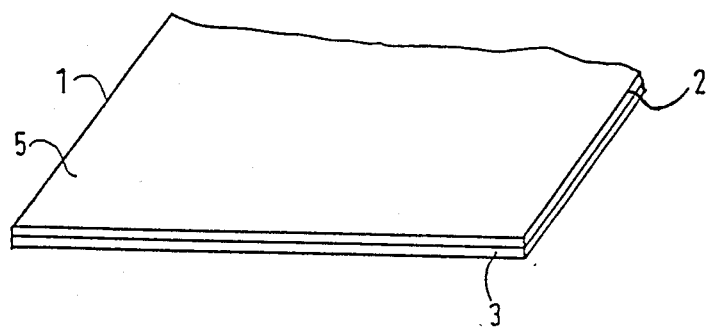
FIG. 1 is a view of a composite sheet.
Figure 2:
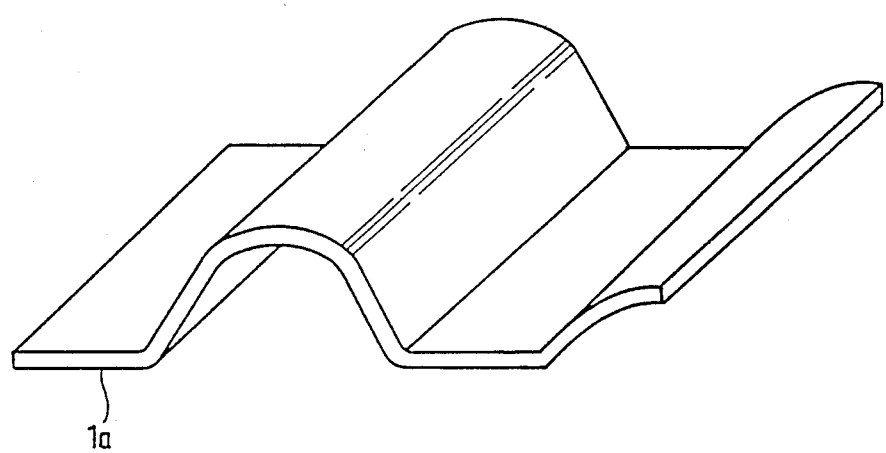
FIG. 2 is a view of a deep-drawn molded part from a composite sheet.

However, it is also possible to press the composite sheet 1 according to FIG. 1 likewise into the desired shape under preheating with the use of a compression mold.

The invention will be described with reference to the examples below.

The following measuring criteria were utilized for testing the properties:

Shore hardness D according to DIN 53505
tensile strength according to DIN 54355
Mooney viscosity measurement according to ASTM-D 1640
melt index MFI according to DIN 53735
separating strength according to DIN 53357 deflection temperature under load according to Vicat per DIN 53460
tensile strength at break according to DIN 53455
elongation at break according to DIN 53455
tensile stress at yield according to DIN 53455
low-temperature impact resistance value according to VDCh.

EXAMPLE 1:

Production of the Sheet

In a mixer that can be heated and cooled, a pourable mixture is produced at 70° C. by processing 60 parts by weight of polypropylene copolymer with an ethylene content of 10% and a MFI (190/5) of 0.8 g/10 min with 40 parts by weight of EPDM having a Mooney viscosity ML(1+4) 100° C. of 85, a MFI (230/5) of 0.8 g/10 min, and an ethylene content of 67% by weight, a propylene content of 30% by weight, and an ethylidene norbornene content of 3% by weight and a tensile strength of 16.3 N/mm$^2$ and a DSC maximum temperature of 44° C., with 0.45 part by weight of sterically hindered amine ("Chimasorb" 944) and benzotriazole ("Tinuvin" 327) as the stabilizer, 0.15 part by weight of calcium stearate as the lubricant, and 2 parts by weight of colorant (TiO$_2$); the mixture is plasticized and homogenized in a twin screw unit at temperatures of up to 200° C. and introduced into a rolling mill. From the latter, the composition is fed at a temperature of about 180°-190° C. to a calender and drawn into a sheet of 0.75 mm. An embossing device is arranged at the outlet of the calender, producing the desired surface texture at an embossing temperature of the embossing roll of about 110° C. and under an embossing pressure of 40 bar. The sheet has a tensile strength at break in the longitudinal extension of 28 N/mm$^2$ and an elongation at break in the longitudinal extension of 635%, the low-temperature impact resistance value being −55° C., the Shore hardness D being 50. The plasticized composition had a MFI (230/5) of 1.8 g/10 min.

EXAMPLE 2:

Production of a Sheet

In a mixer that can be heated and cooled, 47 parts by weight of the polypropylene copolymer mentioned in Example 1 is premixed at 70° C. with 53 parts by weight of the EPDM from Example 1 and the remaining additives of Example 1; the mixture is fed into a twin-shaft kneader and plasticized at 170°-180° C. and introduced into a rolling mill with temperatures of about 180°-200° C. The calender is fed, via a strainer, with the composition, plasticized at about 190° C., and a sheet having a thickness of 0.8 mm is calendered therefrom, embossing being performed subsequently.

The sheet of a thickness of 0.8 mm has a tensile strength at break in the longitudinal direction of 26.5 N/mm$^2$ and an elongation at break in the longitudinal direction of 650%, and a tensile stress at yield in the longitudinal direction of 10.6 N/mm$^2$, with a Shore hardness D of 49 and a low-temperature impact resistance value according to VDCh of −55° C. The MFI (230/5) of the mixture amounted to 1.6 g/10 min.

EXAMPLE 3:

Production of a Sheet

As described in Example 2, a sheet is made by calendering. The thickness of the sheet was 0.3 mm, the tensile strength at break was measured to be 26 N/mm$^2$ and the elongation at break to be 670%. The low-temperature impact resistance value according to VDCh amounted to −55° C., Shore hardness D was 48.

EXAMPLE 4:

Production of a Sheet

In a mixer that can be heated and cooled, a premix is formed from 42 parts by weight of a polypropylene homopolymer with a density of 0.9 g/ml and a MFI (190/5) of 0.7 g/10 min with 58 parts by weight of the EPDM from Example 1; the premix is plasticized in an internal mixer and homogenized therein, and fed to the calender via a rolling mill where it is drawn into a sheet having a thickness of 0.8 mm, and embossed. The sheet has a tensile strength at break in the longitudinal extension of 25 N/mm$^2$ and an elongation at break in the longitudinal extension of 680%. The MFI (230/5) of the mixture was 1.5 g/10 min.

EXAMPLES 5-13:

Production of Foam Materials

The foam materials for laminating the sheets produced in Examples 1-4 were prepared as follows:

A homogeneous mixture is prepared from respectively 100 parts by weight of the polyolefin or polyolefin mixture mentioned in Table 1 with the amounts of azodicarbonamide and dicumyl peroxide likewise set forth in Table 1, processed into a homogeneous, granulated material by plasticizing, and converted into a matrix by subsequent extrusion. This matrix is processed in a circulating-air furnace at 225° C. into a foam, the gross density of which is in each case 30 kg/m$^3$, and the thickness of which is indicated in Table 1.

The matrix required for producing the foam according to Example 6 was additionally laminated on one side with a polyethylene film having a thickness of 230 μm.

The composition of Example 7 does not contain dicumyl peroxide since the matrix was treated prior to blowing with 9 Mrad electron beam and was thus cross-linked.

Examples 5, 6, 7, 8, 11 are comparative examples.

EXAMPLE 14: (COMPARISON)

The polypropylene-EPDM sheet having a thickness of 0.8 mm, produced in Example 2, was bonded in a flame laminating installation at a rate of 6.5 and, respectively, 8.0 m/min to the polyethylene foam having a thickness of 10 mm, produced in Example 5. The peeling resistance of the two substrates was measured as the separating strength according to DIN 53357. The separating resistance is indicated in Table 2.

EXAMPLE 15: (COMPARISON)

A composite was produced as described in Example 14 from the sheet of Example 2 and the foam of Example 6; the side of the foam carrying the PE film was laminated to the PP/EPDM sheet. The measured separating strength values can be seen from Table 2.

EXAMPLE 16: (COMPARISON)

A composite was made as described in Example 14 from the sheet of Example 2 and the physically cross-linked foam of Example 7 at a laminating speed of 8.0 and, respectively, 10.0 m/min. Separating strengths are listed in Table 2.

EXAMPLE 17: (COMPARISON)

The sheet of Example 3 was flame-laminated to the foam of Example 8, cotnaining 9% by weight of vinyl acetate, at 8.0 and, respectively, 10.0 m/min. The separating strengths are compiled in Table 2.

EXAMPLE 18:

A composite was produced by flame laminating from the PP/EPDM sheet of Example 2 and from the foam of Example 9, containing 15% by weight of vinyl acetate, at 4.0; 6.5; and 8.0 m/min. The separating strengths measured can be seen from Table 2.

EXAMPLE 19:

The PP/EPDM sheet of Example 2 was flame laminated with the foam of Example 10, containing 25% by weight of vinyl acetate, at 6.5 and 8.0 m/min. The separating strengths are listed in Table 2.

EXAMPLE 20: (COMPARISON)

A composite was produced from PP/EPDM sheet of Example 2 and the foam of Example 11, containing polyethylene and EPDM, by means of flame laminating at 8.0 and 10.0 m/min. The measured separating strengths can be derived from Table 2.

EXAMPLE 21:

The PP/EPDM sheet produced in Example 2 was flame laminated to the foam of ethylene-butyl acrylate copolymer and polyethylene according to Example 12 at speeds of 8.0 and 10.0 m/min. Separation of the two substrates was no longer possible since the foam was previously torn apart. The measured values are in Table 2.

EXAMPLE 22:

A composite was produced from the PP/EPDM sheet of Example 2 and the foam of Example 13, containing 19% by weight of butyl acrylate, by means of flame laminating at 8.0 and 10.0 m/min. Separation of the two substrates was no longer possible. The testing data are listed in Table 2.

EXAMPLE 23:

The PP/EPDM sheet produced in Example 1 was flame laminated at 8.0 and 10.0 m/min with the foam containing butyl acrylate prepared according to Example 12, and tested for separating strength. Test values, see Table 2.

EXAMPLE 24:

The PP/EPDM sheet produced in Example 4 was flame laminated at 8.0 and 10.0 m/min with the foam of Example 12. Separation was no longer possible (see Table 2).

As can be seen from Table 2, no satisfactory adhesion values are obtained by attempting flame laminating between a PP/EPDM sheet and a pure polyethylene foam (Example 14); a pure polyethylene foam previously laminated on its topside with a polyethylene film (Example 15); a pure polyethylene foam with physical crosslinking (Example 16); a polyethylene foam containing only 9% by weight of vinyl acetate (Example 17); and a polyethylene foam containing EPDM (Example 20).

Satisfactory adhesion is attained when flame laminating with a foam containing 15% by weight of vinyl acetate, if laminating is carried out with particular slowness, but the economy is still very low (Example 18).

Improved economy by higher laminating speeds is attained with a foam having 25% by weight of vinyl acetate (Example 19).

Very good adhesion, even at high laminating speeds, is obtained with foams containing butyl acrylate, as proven by Examples 21-24.

TABLE 1

|  | Examples | | | | | | | | |
|---|---|---|---|---|---|---|---|---|---|
|  | 5 | 6 | 7 | 8 | 9 | 10 | 11 | 12 | 13 |
| LD-PE (Parts by Weight) | 100 | 100 | 100 | — | — | — | 71 | 25 | — |
| MFI (190/2.16) | 2 | 2 | 2 | — | — | — | 4 | 2 | — |
| Copolymer (Parts by Weight) | — | — | — | 100 | 100 | 100 | — | 75 | 100 |
| MFI (190/2.16) | — | — | — | 7 | 2.5 | 2.1 | — | 2 | 2 |
| Vinyl Acetate Content (% by Wt) | — | — | — | 9 | 15 | 25 | — | — | — |
| Butyl Acrylate Content (% by Wt) | — | — | — | — | — | — | — | 19 | 19 |
| EPDM (Parts by Weight) | — | — | — | — | — | — | 29 | — | — |
| Azodicarbonamide (Parts by Wt) | 19 | 19 | 23 | 23 | 19 | 19 | 23 | 23 | 19 |
| Dicumyl Peroxide (Parts by Wt) | 0.9 | 0.9 | — | 0.9 | 0.9 | 0.9 | 0.9 | 0.9 | 0.9 |
| Matrix Laminated with PE Film | — | + | — | — | — | — | — | — | — |
| Foam Thickness (mm) | 10 | 10 | 5 | 6 | 10 | 10 | 5 | 5 | 10 |

TABLE 2

| Example No. | Foam Thickness (mm) | Laminating Speed (m/min) | Separating Strength (N/5 cm) |
|---|---|---|---|
| 14 | 10 | 6.5 | 2.0 |
| " | 10 | 8.0 | 1.5 |
| 15 | 10 | 6.5 | 2.4 |
| " | 10 | 8.0 | 1.5 |
| 16 | 5 | 8.0 | 2.4 |
| " | 5 | 10.0 | 1.9 |
| 17 | 6 | 8.0 | 1.9 |
| " | 6 | 10.0 | 1.9 |
| 18 | 10 | 4.0 | >25.0* |
| " | 10 | 6.5 | 1.7 |
| " | 10 | 8.0 | 1.8 |
| 19 | 10 | 6.5 | >27.2* |
| " | 10 | 8.0 | 4.4 |
| 20 | 5 | 8.0 | 5.3 |
| " | 5 | 10.0 | 2.5 |
| 21 | 5 | 8.0 | >17.0* |
| " | 5 | 10.0 | >16.5* |
| 22 | 10 | 8.0 | >26.0* |
| " | 10 | 10.0 | >18.0* |
| 23 | 5 | 8.0 | >17.0* |
| " | 5 | 10.0 | >17.0* |
| 24 | 5 | 8.0 | >17.0* |
| " | 5 | 10.0 | >17.0* |

*Separating strength of substrates is larger than intrinsic strength of foam; consequently tearing away or splitting of the foam.

What is claimed is:
1. A multi-ply, weatherable, plasticizer-free and deep-drawable sheet for the internal and external outfitting of automotive vehicles, comprising:

a first layer comprised of an ethylene-propylene-diene terpolymer and a homopolymer and/or copolymer of propylene, produced by extrusion or calendering with a sheet thickness of 0.2 to 3 mm bonded to a second layer comprised of a crosslinked polyolefin resin-containing foam; said first layer containing 65-25% by weight of a partially crystalline ethylene-propylene-diene terpolymer comprising 65-82% by weight of ethylene;

18-35% by weight of propylene, and 3-8% by weight of a diene tercomponent, with a melt index MFI (230/5) of 0.5-2.0 g/10 min., a tensile strength of at least 10 N/mm$^2$, and DSC maximum temperature of at least 40° C.;

35-75% by weight of at least one propylene polymer selected from the group consisting of homopolymer and a copolymer of propylene, with a melt index MFI (230/2.16) of 0.2-2 g/10 min.;

0-10% by weight of fillers, comprising at least one of chalk, kaolin, talc, carbon black, silica and silicic anhydride; as well as, per 100 parts of said polymers:

0.1-1.0 parts by weight of stabilizers comprising at least one of sterically hindered phenolic antioxidants, phenolic phosphites and thioesters of aliphatic carboxylic acids;

0.1-2 parts by weight of a lubricant comprising at least one of metallic salts of carboxylic acids, montanic acid esters and hydrogenated hydrocarbon resins;

0-5 parts by weight of colorants; and 0-4 parts by weight of an extender oil;

said second layer containing, in 100 parts by weight of the polyolefin-containing resin, at least 15% by weight of a polar, copolymerized monomer;

said first layer and said second layer being adhesively bonded directly to each other by thermal pressure bonding or flame laminating.

2. A sheet according to claim 1, wherein said first layer contains an ethylene-propylene-diene terpolymer having a tensile strength of at least 15 N/mm$^2$.

3. A sheet according to claim 1, wherein said first layer comprises an ethylene-propylene-diene terpolymer having a DSC maximum temperature of at least 43° C.

4. A sheet according to claim 1, wherein said first layer contains an ethylene-propylene-diene terpolymer with an ethylene content of at least 70% by weight.

5. A sheet according to claim 1, wherein said first layer contains a propylene homopolymer and/or propylene copolymer having a melt index MFI (230/2.16) of smaller than 1 g/10 min.

6. A sheet according to claim 1, wherein said first layer contains a propylene copolymer with an ethylene content of 5-20% by weight.

7. A sheet according to claim 1, wherein said fillers have a maximum particle size determined by passage through a 30 μm sieve.

8. A sheet according to claim 1, wherein a separating force between the first layer and the second layer amounts to at least 8 N/5cm and is higher than the intrinsic strength of the foam.

9. A sheet according to claim 1, wherein said polar copolymerized monomer is butyl acrylate in an amount of at least 15% by weight based on the polyolefin-containing resin.

10. A sheet according to claim 1, wherein the polar copolymerized monomer is vinyl acetate in an amount of at least 20% by weight based on the polyolefin-containing resin.

* * * * *